US008849997B2

(12) United States Patent
Okuno et al.

(10) Patent No.: US 8,849,997 B2
(45) Date of Patent: Sep. 30, 2014

(54) INFORMATION MANAGEMENT APPARATUS AND INFORMATION MANAGEMENT SYSTEM

(75) Inventors: Susumu Okuno, Tokyo (JP); Ryoichi Himono, Tokyo (JP); Kimikazu Takahashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 13/402,428

(22) Filed: Feb. 22, 2012

(65) Prior Publication Data
US 2012/0215913 A1 Aug. 23, 2012

(30) Foreign Application Priority Data
Feb. 23, 2011 (JP) ................. P2011-037259

(51) Int. Cl.
- *G06F 15/173* (2006.01)
- *H04L 12/26* (2006.01)
- *G05B 23/02* (2006.01)

(52) U.S. Cl.
CPC ............ *G05B 23/0221* (2013.01); *H04L 43/00* (2013.01)
USPC ............................. 709/224; 709/217; 709/218

(58) Field of Classification Search
USPC ............. 709/217, 218, 224; 700/90, 95, 700/108–110, 159, 169, 173–175, 180, 286, 700/289; 702/33, 45–57, 85, 98–100, 702/103–105, 127, 130, 137, 138, 187, 702/188; 340/870.01, 870.02, 870.07, 500, 340/501, 539.26, 286.01
See application file for complete search history.

(56) References Cited

U.S. PATENT DOCUMENTS

| 6,606,582 B1 * | 8/2003 | Brinkman et al. ............ 702/188 |
| 6,615,090 B1 * | 9/2003 | Blevins et al. ................. 700/26 |
| 7,147,600 B2 * | 12/2006 | Bardy ........................... 600/300 |
| 7,526,405 B2 * | 4/2009 | Miller ........................... 702/179 |
| 7,702,413 B2 * | 4/2010 | Ushiku et al. ................ 700/121 |
| 8,027,804 B2 * | 9/2011 | Kavaklioglu ................. 702/179 |
| 8,108,790 B2 * | 1/2012 | Morrison et al. ............ 715/771 |
| 8,305,737 B2 * | 11/2012 | Ewing et al. ................. 361/622 |
| 2002/0198454 A1 * | 12/2002 | Seward et al. ................ 600/437 |

(Continued)

FOREIGN PATENT DOCUMENTS

| EP | 2398190 A1 | 12/2011 |
| JP | 2007-058559 A | 3/2007 |
| JP | 2007058559 A * | 3/2007 |

OTHER PUBLICATIONS

Partial European Search Report dated May 8, 2013, issued in corresponding European Patent Application No. 12156528.7.

(Continued)

*Primary Examiner* — Thai Nguyen
*Assistant Examiner* — Phyllis Book
(74) *Attorney, Agent, or Firm* — Westerman, Hattori, Daniels & Adrian, LLP

(57) ABSTRACT

An information management apparatus may include a first collection unit that collects a measurement value measured by a measurement device connected to the information management apparatus via a network, a second collection unit that collects status information indicating statuses of the measurement device and the network, and a correction unit that correcting quality information indicating validity of the measurement value, which has been collected by the first collection unit, by using the status information that has been collected by the second collection unit.

14 Claims, 4 Drawing Sheets

(56) References Cited

U.S. PATENT DOCUMENTS

| | | | |
|---|---|---|---|
| 2005/0004781 A1* | 1/2005 | Price et al. | 702/188 |
| 2006/0259199 A1* | 11/2006 | Gjerde et al. | 700/284 |
| 2007/0150114 A1* | 6/2007 | Gardner et al. | 700/286 |
| 2007/0179357 A1* | 8/2007 | Bardy | 600/300 |
| 2008/0208527 A1* | 8/2008 | Kavaklioglu | 702/179 |
| 2008/0244329 A1 | 10/2008 | Shinbo et al. | |
| 2009/0281673 A1* | 11/2009 | Taft | 700/286 |
| 2010/0027434 A1 | 2/2010 | Chung et al. | |
| 2010/0152910 A1* | 6/2010 | Taft | 700/286 |
| 2011/0004446 A1* | 1/2011 | Dorn et al. | 702/188 |
| 2011/0082599 A1* | 4/2011 | Shinde et al. | 700/295 |
| 2011/0191465 A1* | 8/2011 | Hofstaedter et al. | 709/224 |
| 2012/0005334 A1* | 1/2012 | Raja et al. | 709/224 |

OTHER PUBLICATIONS

Suhonen, J. et al., "Embedded Software Architecture for Diagnosing Network and Node Failures in Wireless Sensor Networks", Embedded Computer Systems: Architectures, Modeling, and Simulation, Jul. 21, 2008, p. 258-267; cited in Partial European Search Report dated May 8, 2013.

* cited by examiner

INFORMATION MANAGEMENT APPARATUS AND INFORMATION MANAGEMENT SYSTEM

BACKGROUND OF THE INVENTION

1. Field of the Invention

The present invention relates to an information management apparatus and an information management system, which manage information collected in a plant, a factory, or the like.

Priority is claimed on Japanese Patent Application No. 2011-037259, filed Feb. 23, 2011, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the related art, a distributed control system (DCS) in which field devices (a measurement unit and an operation unit) are connected to a device management apparatus for managing and controlling the field devices via a communication bus has been constructed to implement an advanced automatic operation in a plant or the like. In the DCS, a plant information management system (PIMS) is usually introduced to accumulate collected data over a long period and provide the accumulated data in a necessary format at a necessary time so as to easily manage an enormous amount of data (for example, process data) collected in the plant or the like.

By introducing the plant information management system, operation situations in the plant or the like can be managed in real time and also management of production results based on ledger sheets, simplified analysis based on trend graphs, and advanced processing based on prediction/diagnosis/multivariate analysis can be performed. In Japanese Unexamined Patent Application, First Publication No. 2007-58559, a plant monitoring system, which has a plant information management apparatus for collecting and managing process data of field devices and monitors a plant using the process data managed by the plant information management apparatus, is disclosed.

Incidentally, it is significantly important to collect measurement values correctly measured by field devices so as to accurately perform the management of the production results based on the ledger sheets and the simplified analysis based on the trend graphs described above by introducing the plant information management system. In particular, because a process of extracting a difference between measurement values measured in time series and observing a change is usually performed in the above-described advanced processing, the validity of each measured measurement value is significantly important.

Here, the plant information management system of the related art collects only measurement values from the field devices without collecting information indicating statuses of the field devices or statuses of paths from the field devices to the plant information management system. Thus, there is a problem in the validity of a measurement value, for example, because collected information is also handled as a normal value in the plant information management system when the field device fails or when a device (for example, a router) located on the path from the field device to the plant information management system fails.

In addition, if a measurement value of which the validity is doubtful has been collected, it is necessary to specify its cause and exchange the device. However, in the related art, it is time consuming to specify the cause because the statuses of all devices located on the path in which a measurement value has been collected should be checked when the measurement value of which the validity is doubtful has been collected because the information indicating the status of the field device or the status of the path from the field device to the plant information management system is not collected in the plant information management system as described above.

SUMMARY

The present invention provides an information management apparatus and an information management system, which can improve validity of a collected measurement value and easily investigate the cause of collection of a measurement value of which the validity is doubtful.

An information management apparatus may include: a first collection unit that collects a measurement value measured by a measurement device connected to the information management apparatus via a network; a second collection unit that collects status information indicating statuses of the measurement device and the network; and a correction unit that correcting quality information indicating validity of the measurement value, which has been collected by the first collection unit, by using the status information that has been collected by the second collection unit.

The quality information may be added to the measurement value collected by the first collection unit. The correction unit may correct the quality information, which has been added to the measurement value, by using the status information that has been collected by the second collection unit.

The second collection unit may collect device data of a path device included in the measurement device and the network in addition to the status information. The correction unit may generate status information, which indicates a status of a measurement device or a path device, by using the device data, which has been collected by the second collection unit, if there is the measurement device or the path device of which status information is not obtained.

If there is a measurement device or a path device of which a plurality of pieces of status information are obtained, then the correction unit may generate representative status information by combining the plurality of pieces of status information.

The information management apparatus may further include: a display unit that displays the measurement value, which has been collected by the first collection unit, and the status information, which has been collected by the second collection unit, in parallel on the same time axis.

The display unit may include: a first display area that displays time-series information regarding a process specified by a process identifier designated by a user; and a second display area that displays time-series information regarding the measurement device specified by a device identifier designated by the user.

The display unit may have a filter function of selecting information to be displayed based on the user's instruction.

An information management system may include an information management apparatus and a display apparatus. The information management apparatus may include: a first collection unit that collects a measurement value measured by a measurement device connected to the information management apparatus via a network; a second collection unit that collects status information indicating statuses of the measurement device and the network; and a correction unit that corrects quality information, which indicates validity of the measurement value collected by the first collection unit, by using the status information that has been collected by the second collection unit. The display apparatus may display the measurement value, which has been collected by the first collection unit, and the status information, which has been collected by the second collection unit, in parallel on the same time axis.

The quality information may be added to the measurement value collected by the first collection unit. The correction unit may correct the quality information, which has been added to the measurement value, by using the status information that has been collected by the second collection unit.

The second collection unit may collect device data of a path device included in the measurement device and the network in addition to the status information. The correction unit may generate status information, which indicates a status of a measurement device or a path device, by using the device data, which has been collected by the second collection unit, if there is the measurement device or the path device of which status information is not obtained.

If there is a measurement device or a path device of which a plurality of pieces of status information are obtained, then the correction unit may generate representative status information by combining the plurality of pieces of status information.

The display apparatus may further include: a display unit that displays the measurement value, which has been collected by the first collection unit, and the status information, which has been collected by the second collection unit, in parallel on the same time axis.

The display apparatus may have a filter function of selecting information to be displayed based on the user's instruction.

An information management method may include: a step of collecting a measurement value measured by a measurement device connected via a network; a step of collecting status information indicating statuses of the measurement device and the network; and a step of correcting quality information indicating validity of the measurement value, which has been collected, by using the status information that has been collected.

The quality information may be added to the measurement value collected by the first collection unit. The information management method may further include: a step of correcting the quality information, which has been added to the measurement value, by using the status information that has been collected.

The information management method may further include: a step of collecting device data of a path device included in the measurement device and the network in addition to the status information, and a step of generating status information, which indicates a status of a measurement device or a path device, by using the device data, which has been collected, if there is the measurement device or the path device of which status information is not obtained.

The information management method may further include: a step of generating representative status information by combining the plurality of pieces of status information, if there is a measurement device or a path device of which a plurality of pieces of status information are obtained.

The information management method may further include: a step of displaying the measurement value, which has been collected, and the status information, which has been collected, in parallel on the same time axis.

The information management method may further include: a step of displaying time-series information regarding a process specified by a process identifier designated by a user; and a step of displaying time-series information regarding the measurement device specified by a device identifier designated by the user.

The information management method may further include: a step of selecting information to be displayed based on the user's instruction.

According to the present invention, because quality information indicating validity of a measurement value collected by a first collection unit is corrected by a correction unit using status information collected by a second collection unit, the validity of the collected measurement value can be improved. In addition, because the measurement value collected by the first collection unit and the status information collected by the second collection unit are displayed in parallel on the same time axis, the cause of collection of a measurement value of which validity is doubtful can be easily investigated.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
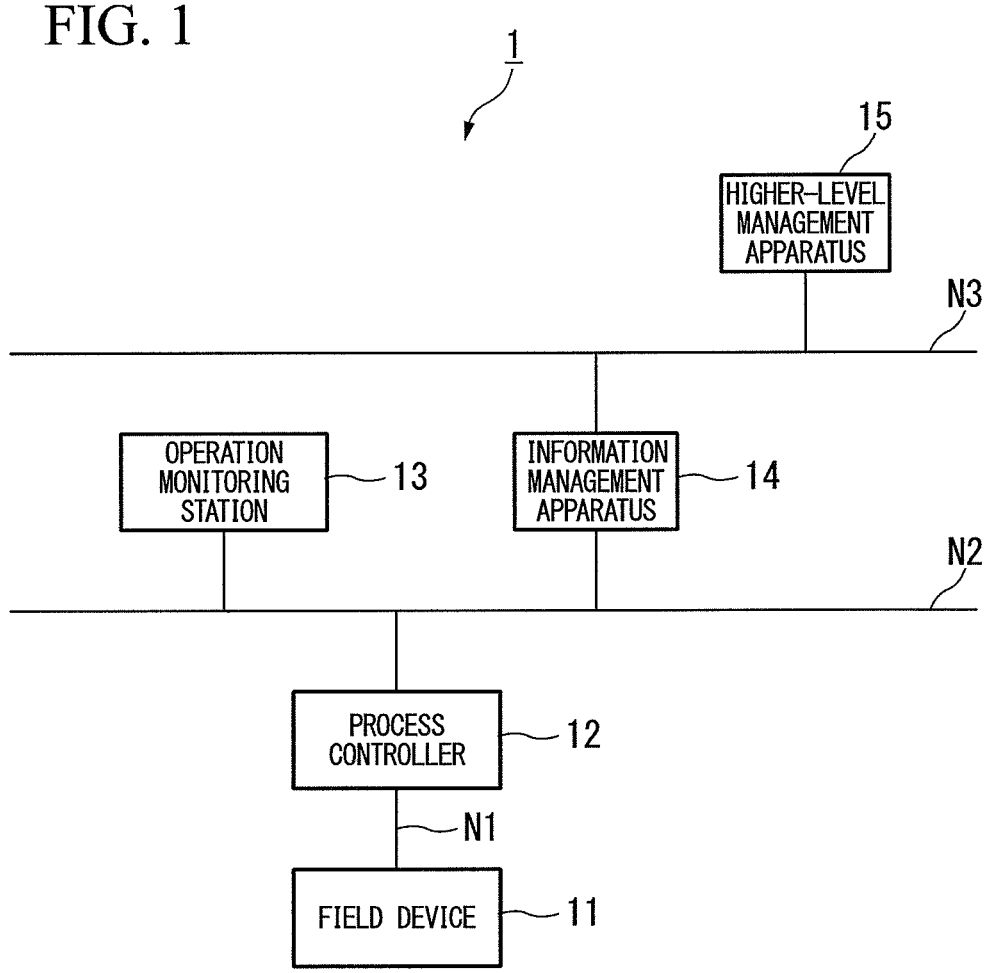
FIG. 1 is a block diagram illustrating the entire configuration of an information management system in accordance with a first preferred embodiment of the present invention.

Hereinafter, an information management apparatus and an information management system in accordance with a first preferred embodiment of the present invention will be described in detail with reference to the drawings. FIG. 1 is a block diagram illustrating the entire configuration of the information management system in accordance with a first preferred embodiment of the present invention. As illustrated in FIG. 1, the information management system 1 in accordance with the first preferred embodiment includes a field device 11 (a measurement device), a process controller 12, an operation monitoring station 13 (a display apparatus), an information management apparatus 14, and a higher-level management apparatus 15 (a display apparatus). In the information management system 1, the information management apparatus 14 collects and manages a measurement value measured by the field device 11 via the process controller 12.

An example of the field device 11 is a sensor device such as a flow meter or a temperature sensor, a valve device such as a flow control valve or an on-off valve, an actuator device such as a fan or a motor, or a device installed in a field of a plant or factory. For example, the field device 11 measures a flow rate, a temperature, a degree to which a valve is opened, or a rotational speed of the motor, and outputs a measurement result as a measurement value. A plurality of field devices 11 are installed in a plant or the like, connected to a field network N1 installed in each plant, and controlled by the process controller 12. The field device 11 has a self-diagnosis function of diagnosing its own status.

The process controller 12 is connected to the field network N1 and a control network N2, and controls the field device 11 connected to the field network N1 based on an instruction of the operation monitoring station 13 or the higher-level management apparatus 15. Specifically, the process controller 12 performs control of the field device 11 connected to the field network N1 (for example, control of valve on-off and the like), collection of a measurement value measured by the field device 11 connected to the field network N1, and the like. In addition, the process controller 12 performs a process of adding quality information indicating validity to the measurement value collected from the field device 11. Also, the process controller 12 has a self-diagnosis function of diagnosing its own status.

Here, although not illustrated in FIG. 1 for the sake of simplicity, the field network N1 and the control network N2 include a device (path device) such as a router as well as a communication cable. Devices constituting the field network N1 and the control network N2 include a device having a self-diagnosis function of monitoring statuses of the networks by monitoring communication situations via the field network N1 and the control network N2.

As described above, the information management system 1 of the first preferred embodiment is configured so that devices (the field device 11 and the process controller 12) arranged between the field device 11 and the information management apparatus 14 and the networks (the field network N1 and the control network N2) have the self-diagnosis function. Also, although it is desirable that all devices arranged between the field device 11 and the information management apparatus 14 have the self-diagnosis function, a device without the self-diagnosis function may also be included.

The operation monitoring station 13 is a terminal apparatus to be used to monitor the field device 11 and instruct the field device 11 to perform an operation. In addition, the operation monitoring station 13 is used when analysis (for example, simplified analysis based on trend graphs) is performed using a measurement value managed by the information management apparatus 14. The operation monitoring station 13 is implemented, for example, by a desktop or note type of personal computer or the like having an input apparatus such as a keyboard or a mouse and a display apparatus such as a liquid crystal display (LCD) apparatus.

The information management apparatus 14, connected to the control network N2 and a higher-level network N3, collects a measurement value of the field device 11 via the process controller 12 to manage the collected measurement value. Specifically, the measurement values which are measured by the field device 11 and to which quality information is added by the process controller 12 are accumulated over a long period and provided to the operation monitoring station 13 or the higher-level management apparatus 15 in a necessary format at a necessary time. Also, details of the information management apparatus 14 will be described later.

The higher-level management apparatus 15 is connected to the higher-level network N3 and issues various instructions for managing the field device 11 or various instructions for analyzing information managed by the information management apparatus 14. The higher-level management apparatus 15 is implemented by a desktop or note type of personal computer having an input apparatus such as a keyboard and a display apparatus such as an LCD apparatus, and issues an instruction corresponding to an operation made by a system manager to the information management apparatus 14 or the process controller 12.

Figure 2:
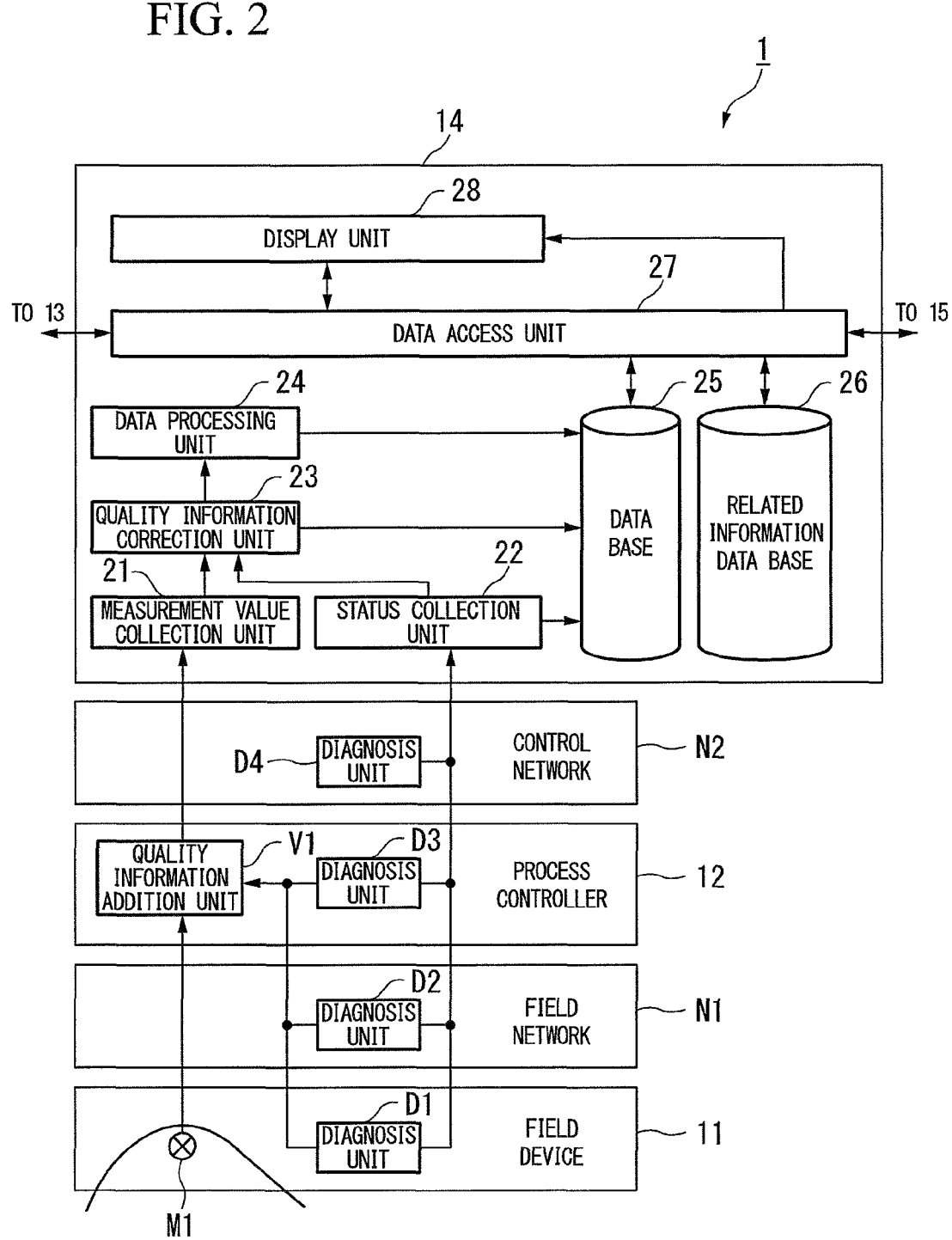
FIG. 2 is a block diagram illustrating internal configurations of apparatuses constituting the information management system in accordance with the first preferred embodiment of the present invention.

FIG. 2 is a block diagram illustrating internal configurations of apparatuses constituting the information management system in accordance with the first preferred embodiment of the present invention. Also, in FIG. 2, blocks corresponding to those illustrated in FIG. 1 are denoted by the same reference numerals. First, as illustrated in FIG. 2, diagnosis units D1 to D4, which perform status diagnosis, are provided in the field device 11, the field network N1, the process controller 12, and the control network N2, respectively. The diagnosis units D1 to D4 output status information such as "normal," "doubtful validity," "abnormality," and "invalidity" as information indicating their diagnosis results. Also, the diagnosis units D2 and D4 provided in the field network N1 and the control network N2 are each provided, for example, in the devices (path devices) constituting the networks.

In addition, as illustrated in FIG. 2, a measurement unit M1, which measures a temperature, a degree to which a valve is opened, a rotational speed of a motor, and the like, is provided in the field device 11 in addition to the above-described diagnosis unit D1. In addition to the above-described diagnosis unit D3, a quality information addition unit V1, which adds quality information indicating validity to the measurement value measured by the measurement unit M1 of the field device 11, is provided in the process controller 12.

Next, as illustrated in FIG. 2, the information management apparatus 14 includes a measurement value collection unit 21 (a first collection unit), a status collection unit 22 (a second collection unit), a quality information correction unit 23 (a correction unit), a data processing unit 24, a database 25, a related information database 26, a data access unit 27, and a display unit 28. The measurement value collection unit 21 collects measurement values which are measured by the measurement unit M1 of the field device 11 and to which quality information is added by the quality information addition unit V1 of the process controller 12.

The status collection unit 22 collects status information output from the diagnosis units D1 to D4 provided in the field device 11, the field network N1, the process controller 12, and the control network N2. In addition, the status collection unit 22 also collects device data provided in the field device 11 and the process controller 12 and the devices (path devices) constituting the field network N1 and the control network N2. Here, the device data is data indicating an operation time of the device or secondarily obtained measurement data (for example, data indicating a temperature when a thermometer is provided in the device).

The quality information correction unit 23 corrects the quality information added to the measurement value collected by the measurement value collection unit 21 using the status information collected by the status collection unit 22. Here, when the field device 11 having the diagnosis unit D1 and a field device without the diagnosis unit D1 are both included, only the measurement value is obtained from the field device of the latter and no status information is obtained therefrom. In this case, the quality information correction unit 23 generates status information using the device data obtained from the device and using a process value if necessary, and corrects the measurement value using the generated status information. In addition, a plurality of pieces of status information may be obtained with respect to one device. In this case, the quality information correction unit 23 generates representative status information by combining the plurality of pieces of status information, and corrects the measurement value using the generated representative status information.

The data processing unit 24 performs data processing for the measurement value collected by the measurement value collection unit 21 and the quality information added to the measurement value. Specifically, the data processing unit 24 aggregates the collected measurement value and the quality information, or generates a production information value and quality information of the production information value by carrying out a predetermined arithmetic operation using the collected measurement value and the quality information. The generated production information value or quality information is stored in the database 25. Also, if the quality information has been corrected by the quality information correction unit 23, the data processing unit 24 performs the above-described data processing using the corrected quality information.

The database 25 stores a process value, a production information value, device data, status information, and the like. Here, the quality information is included in the process value and the production information value stored in the database 25, and the above-described representative status information is included in the status information. The related information database 26 stores related information such as path information, information specifying the field device 11, or information related to the production information value.

Specifically, the related information database 26 stores path information indicating a two-way path until the measurement value measured by the measurement unit M1 of the field device 11 reaches from the field device 11 to the information management apparatus 14. In addition, information indicating a correspondence relationship between a device tag physically specifying the field device 11 and a process tag logically specifying the field device 11 is stored. Further, information indicating the measurement value from which the production information value is generated is stored.

The data access unit 27 searches the database 25 and the related information database 26 according to a request of the operation monitoring station 13 or the higher-level management apparatus 15 illustrated in FIG. 1 or the display unit 28, and reads necessary information from the database 25 and the related information database 26.

The display unit 28 includes a display apparatus such as an LCD apparatus, and requests the data access unit 27 to acquire data corresponding to the user's instruction, and displays the data acquired by the data access unit 27 on the display apparatus.

Also, although details will be described later, the display unit 28 displays the measurement value collected by the measurement value collection unit 21 and information indicating a change in the status information collected by the status collection unit 22 in parallel on the same time axis. In addition, a function of the display unit 28 is provided in the operation monitoring station 13 or the higher-level management apparatus 15 illustrated in FIG. 1. Thus, the operation monitoring station 13 or the higher-level management device 15 can perform the same display function as the display unit 28.

Next, the operation of the information management system 1 in the above-described configuration will be described.

Here, the operation of the information management system 1 is broadly divided into a collection operation of collecting the measurement value measured by the measurement unit M1 of the field device 11 to the information management apparatus 14 and a display operation of displaying the information managed by the information management apparatus 14 on the display unit 28. Hereinafter, the collection operation will first be described and then the display operation will be described.

In the field device 11, a time interval at which measurement is performed by the measurement unit M1 is preset. If a time specified by the above-described time interval has elapsed from a previous time when measurement was performed by the measurement unit M1, the measurement unit M1 performs the measurement again. The measurement value measured by the measurement unit M1 is transmitted from the field device 11 to the process controller 12 via the field network N1. If the measurement value is received by the process controller 12, the quality information addition unit V1 provided in the process controller 12 adds quality information indicating the validity of the measurement value to the measurement value. The measurement value to which the quality information is added is received from the access controller 12 to the information management apparatus 14 via the control network N2, and collected in the measurement value collection unit 21 provided in the information management apparatus 14.

In addition, the statuses of the field device 11, the field network N1, the process controller 12, and the control network N2 are diagnosed in the diagnosis units D1 to D4, respectively. Status information indicating diagnosis results and device data are collected in the status collection unit 22 provided in the information management apparatus 14. If the measurement values and the status information are collected, a process of correcting quality information added to the measurement value is performed according to the collected status information, if necessary.

Figure 3:
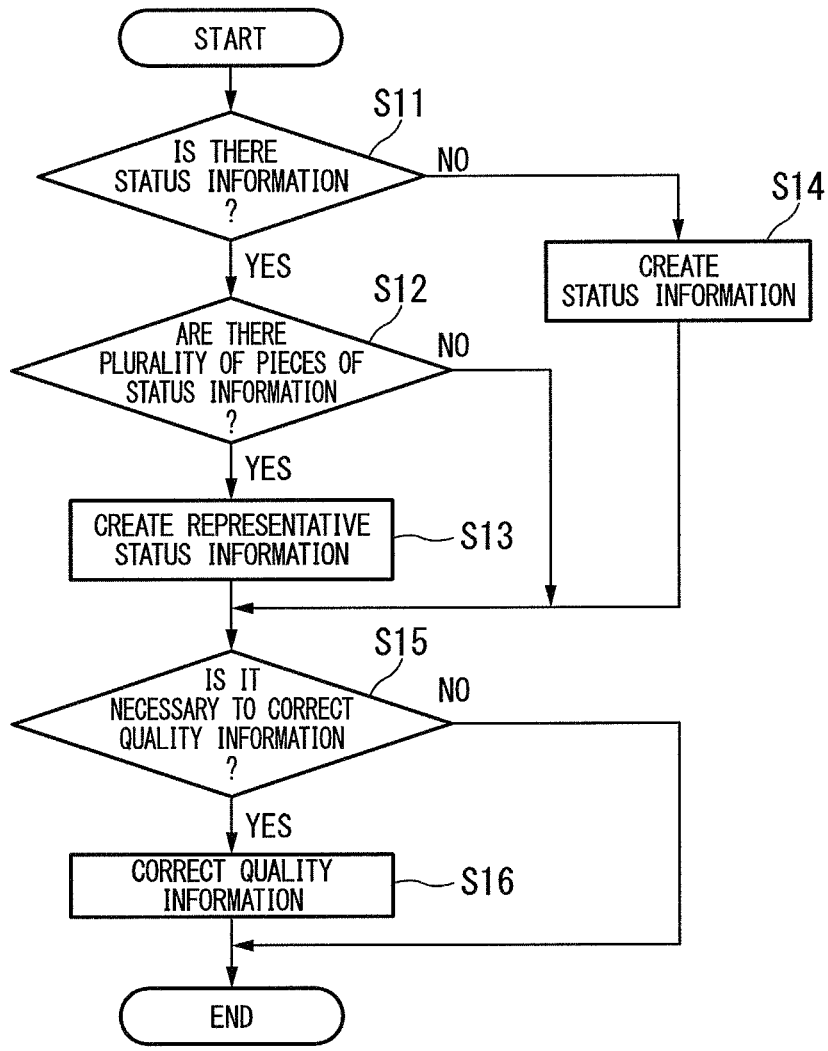
FIG. 3 is a flowchart illustrating a process to be performed by the information management apparatus in accordance with the first preferred embodiment of the present invention.

FIG. 3 is a flowchart illustrating a process to be performed by the information management apparatus in accordance with the first preferred embodiment of the present invention. Also, the process illustrated in FIG. 3 is performed by the quality information correction unit 23 provided in the information management apparatus 14. If the process is started, the quality information correction unit 23 first determines whether or not there is status information for a measurement value collected by the measurement value collection unit 21 (step S11). If the status information is determined to be present (if a determination result of step S11 is "YES"), the quality information correction unit 23 determines whether or not there are a plurality of pieces of status information (step S12).

If the plurality of pieces of status information are determined to be present (if the determination result of step S12 is "YES"), the quality information correction unit 23 generates representative status information by combining the plurality of pieces of status information (step S13). For example, a process of obtaining an average value by allocating a different numeric value to each type of status information (such as "normal," "doubtful validity," "abnormality," or "invalidity") and designating a type closest to the average value as representative status information is performed. Also, a method of generating representative status information is not limited to a method of obtaining the above average value. Also, if the plurality of pieces of status information are determined to be absent (if the determination result of step S12 is "NO"), the process of step S13 is not performed.

On the other hand, if the status information is determined to be absent (if the determination result of step S11 is "NO"), the quality information correction unit 23 generates device status information (step S14). For example, the quality information correction unit 23 generates the status information by performing a statistical analysis or correlation process using device data of a device of which a measurement value is obtained in a state in which status information is absent and using a process value if necessary. According to the above process of steps S11 to S14, only one piece of status information (including representative status information) is ultimately obtained.

Next, the quality information correction unit 23 determines whether or not it is necessary to correct the quality information added to the measurement value collected by the measurement value collection unit 21 (step S15). Specifically, it is determined whether or not the correction is necessary based on content of the status information ultimately obtained through the above process of steps S11 to S14. For example, if the status information indicates "doubtful validity" and the correction is determined to be necessary (if the determination result of step S15 is "YES"), the quality information correction unit 23 corrects the quality information added to the measurement value collected by the measurement value collection unit 21 using the ultimately obtained one piece of status information (step S16). On the other hand, if the correction is determined to be unnecessary (if the determination result of step S15 is "NO"), the series of processes illustrated in FIG. 3 ends.

If the above process ends, the data processing unit 24 performs data processing for the measurement value collected by the measurement value collection unit 21 and the quality information added to the measurement value, thereby generating a production information value and quality information of the production information value. The device data and the status information collected by the status collection unit 22, the measurement value and the quality information collected by the measurement value collection unit 21 (the quality information corrected by the quality information correction unit 23), and the production information value generated by the data processing unit 24 are stored in the database 25 and the related information database 26. Thereby, the measurement value measured by the measurement unit M1 of the field device 11 is collected in the information management apparatus 14.

Next, for example, it is assumed that the user instructs the information management apparatus 14 to display managed information. Specifically, it is assumed that a process identifier, which is an identifier allocated for each process, and a device identifier, which is an identifier allocated for each field device 11, are designated, and a period in which information managed by the information management apparatus 14 should be displayed is designated. If this instruction is issued, a data acquisition request is output from the display unit 28 to the data access unit 27. Then, the data access unit 27 reads necessary information by searching the database 25 and the related information database 26 according to a request from the display unit 28. The information read by the data access unit 27 is output to the display unit 28, and, for example, a display illustrated in FIG. 4 is made.

Figure 4:
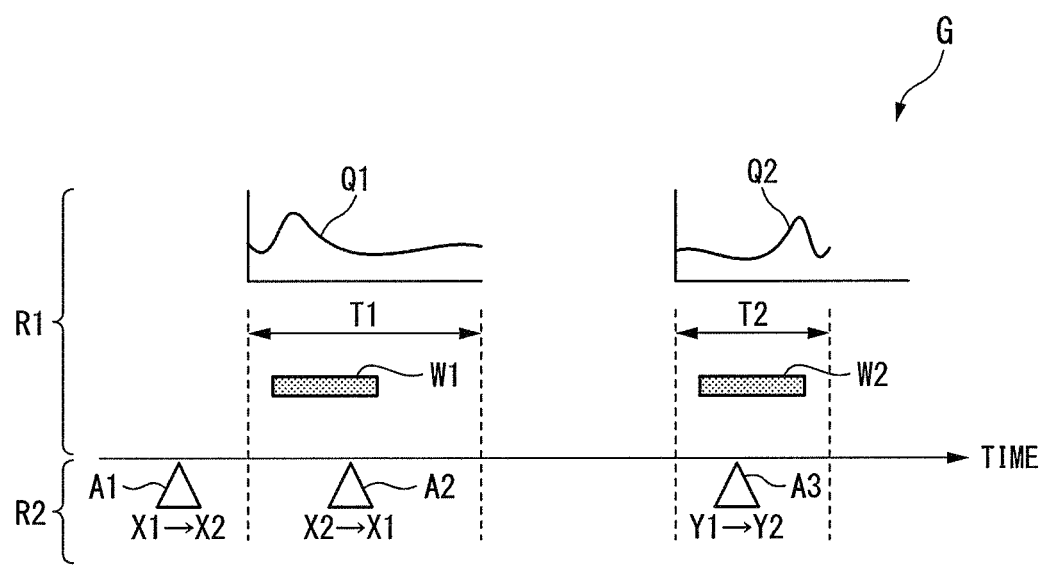
FIG. 4 is a diagram illustrating an example of a display screen displayed by the information management system in accordance with the first preferred embodiment of the present invention.

FIG. 4 is a diagram illustrating an example of a display screen displayed by the information management system in accordance with the first preferred embodiment of the present invention. A display screen G illustrated in FIG. 4 is divided into a display area R1 positioned above a time axis, which is a horizontal axis, and a display area R2 positioned below the time axis. The display area R1 is a display area (process timeline) in which time-series information regarding a process specified by a process identifier designated by the user is displayed. On the other hand, the display area R2 is a display area (device timeline) in which time-series information regarding a device (the field device 11 or a device constituting the network) specified by a device identifier designated by the user is displayed.

Specifically, in the display area R1, information regarding the process (specifically, information collected by the measurement value collection unit 21 of the information management apparatus 14 and information indicating a process alarm) is displayed in time series. In the example of FIG. 4, temporal changes in a measurement value are displayed as trend graphs Q1 and Q2 in period T1 and T2 designated by the user, respectively. In addition, in the periods T1 and T2, indications (caution period indications W1 and W2) indicating periods in which the validity of the measurement value is doubtful are displayed. Also, the caution period indications W1 and W2 are displayed based on quality information added to measurement values.

In addition, in the display area R2, information regarding a device (specifically, information collected by the status collection unit 22 of the information management apparatus 14) is displayed in time series. In the example illustrated in FIG. 4, icons A1 to A3 (indicated by triangle marks in FIG. 4) indicating times when status information has changed are displayed along the time axis. Also, although the icons of the triangle marks are illustrated in FIG. 4, the shapes of the icons A1 to A3 are optional.

As illustrated in FIG. 4, the two display areas R1 and R2 of which types are different are displayed in parallel on the same time axis. Thereby, the user can easily compare information displayed in the display area R1 to information displayed in the display area R2, and easily recognize the relevance between information displayed in the areas. Thus, for example, when the caution period indications W1 and W2 are displayed and there is a period in which the validity of a measurement value or the like is doubtful, the user can investigate its cause (the cause of doubtfulness of the validity of the measurement value or the like) from the relevance between information regarding a process and information regarding a device.

As described above, in the first preferred embodiment, the information management apparatus 14 corrects quality information added to a measurement value collected by the measurement value collection unit 21 using status information collected by the status collection unit 22, thereby improving validity of the collected measurement value. Thereby, it is possible to accurately perform management based on ledger sheets, simplified analysis based on trend graphs, and advanced processing based on prediction/diagnosis/multivariate analysis. In addition, because information collected by the measurement value collection unit 21 and status information collected by the status collection unit 22 are displayed in parallel on the same time axis, it is possible to easily investigate the cause of collection of a measure value of which the validity is doubtful.

Although an information management apparatus and an information management system in accordance with preferred embodiments of the present invention have been described above, the present invention is not limited thereto. A variety of modifications and changes may be made within the scope of the present invention. An example in which the display unit 28 is provided in the information management apparatus 14 and information managed by the information management apparatus 14 is displayed on the display unit 28 has been described in the above-described preferred embodiment. However, the display unit 28 need not necessarily be provided in the information management apparatus 14. The function of the display unit 28 may be provided in the operation monitoring station 13 or the higher-level management apparatus 15, so that the operation monitoring station 13 or the higher-level management apparatus 15 illustrated in FIG. 1 can perform the same display function as the display unit 28.

In addition, an example of the information management system having a field device connected to the field network N1, which is a wired communication bus, has been described. However, wireless communication based on International Society of Automation (ISA) 100.11a, which is a wireless communication standard for industrial automation designated by ISA, is possible according to the present invention, and the present invention is also applicable to an information management system having a field device (wireless field device) capable of wireless communication with the process controller 12.

In addition, an example in which the diagnosis units D1 to D4 are provided in the field device 11, the field network N1, the process controller 12, and the control network N2, respectively, has been described in the above-described preferred embodiment. However, if a failure rate is low, the diagnosis units D2 to D4 may be omitted with respect to the field network N1, the process controller 12, and the control network N2.

In addition, a process alarm may be collected by the measurement value collection unit 21 provided in the information management apparatus 14, and information indicating the generation/return of the process alarm may be indicated on the process timeline displayed on the display area R1 illustrated in FIG. 4. Likewise, the status collection unit 22 provided in the information management apparatus 14 can collect a device alarm (an alarm generated by the field device 11 or a device constituting the network) and display information indicating the generation/return of the device alarm on the device timeline displayed in the display area R2 illustrated in FIG. 4. Further, multimedia data obtained by imaging a device status of the field device 11 or the like may be collected and the collected multimedia data may be displayed on the device timeline.

Here, because the display area R1 in which the process timeline is displayed and the display area R2 in which the device timeline is displayed are displayed in parallel on the same time axis, the relevance can be easily found if much information is displayed in the areas. However, if too much information is displayed, visibility is degraded and a contrary effect is caused. Thus, it is desirable to provide a filter function of selecting information to be displayed on the display screen G illustrated in FIG. 4 according to the user's instruction.

As used herein, the following directional terms "forward, rearward, above, downward, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An information management apparatus comprising:
a first collection unit that collects quality information, from at least one of a process controller, a field network, and a field device, and a measurement value measured by the field device, the process controller being connected to the information management apparatus via a control network, the field device being connected to the process controller via the field network, and the quality information indicating a validity of the measurement value based on status information of the at least one of the process controller, the field network, and the field device;
a second collection unit that collects status information from at least one of the process controller, the field network, the field device, and the control network; and
a correction unit that corrects the quality information collected by the first collection unit using the status information collected by the second collection unit,
wherein the second collection unit collects device data of at least one of the process controller, the field device, a path device included in the field network, and a path device included in the control network, in addition to the status information, and
wherein the correction unit generates the status information using the device data collected by the second collection unit for at least one of the process controller, the field network, and the field device, each not having status information.

2. The information management apparatus according to claim 1, wherein the second collection unit collects a plurality of pieces of status information for the process controller, the field network, and the field device, and the correction unit generates a representative status for the measurement value measured by the field device based on the plurality of pieces of status information.

3. The information management apparatus according to claim 1, further comprising:
a display unit that displays the measurement value collected by the first collection unit, and the status information collected by the second collection unit, in parallel on the same time axis.

4. An information management apparatus, comprising:
a first collection unit that collects quality information, from at least one of a process controller, a field network, and a field device, and a measurement value measured by the field device, the process controller being connected to the information management apparatus via a control network, the field device being connected to the process controller via the field network, and the quality information indicating a validity of the measurement value based on status information of the at least one of the process controller, the field network, and the field device;

a second collection unit that collects status information from at least one of the process controller, the field network, the field device, and the control network;

a correction unit that corrects the quality information collected by the first collection unit using the status information collected by the second collection unit; and a display unit that displays the measurement value collected by the first collection unit, and the status information collected by the second collection unit, in parallel on the same time axis, wherein the display unit comprises:

a first display area that displays time-series information regarding a process specified by a process identifier designated by a user; and a second display area that displays time-series information regarding the field device specified by a device identifier designated by the user.

5. The information management apparatus according to claim 3, wherein the display unit has a filter function of selecting information to be displayed based on the user's instruction.

6. An information management system comprising:
an information management apparatus;
a display apparatus;
a first diagnosis unit disposed in at least one of a process controller, a field network, and a field device, the process controller being connected to the information management apparatus via a control network, the field device being connected to the process controller via the field network, and the first diagnosis unit generating status information indicating a status of the at least one of the process controller, the field network, and the field device; and
a second diagnosis unit disposed in the control network that generates status information indicating a status of the control network,
wherein the information management apparatus comprises:
a first collection unit that collects quality information, from the at least one of the process controller, the field network, and the field device, and a measurement value measured by the field device, the quality information indicating a validity of the measurement value based on the status information of the at least one of the process controller, the field network, and the field device;
a second collection unit that collects the status information from the first and second diagnosis units; and
a correction unit that corrects the quality information-collected by the first collection unit using the status information collected by the second collection unit,
wherein the display apparatus displays the measurement value collected by the first collection unit, and the status information collected by the second collection unit, in parallel on the same time axis,
wherein the second collection unit collects device data of at least one of the process controller, the field device, a path device included in the field network, and a path device included in the control network, in addition to the status information, and
wherein the correction unit generates the status information using the device data collected by the second collection unit for the at least one of the process controller, the field network, and the field device, each not having status information.

7. The information management system according to claim 6, wherein the second collection unit collects a plurality of pieces of status information for the process controller, the field network, and the field device, and the correction unit generates a representative status for the measurement value measured by the field device based on the plurality of pieces of status information.

8. An information management system, comprising:
an information management apparatus;
a display apparatus;
a first diagnosis unit disposed in at least one of a process controller, a field network, and a field device, the process controller being connected to the information management apparatus via a control network, the field device being connected to the process controller via the field network, and the first diagnosis unit generating status information indicating a status of the at least one of the process controller, the field network, and the field device; and
a second diagnosis unit disposed in the control network that generates status information indicating a status of the control network,
wherein the information management apparatus comprises:
a first collection unit that collects quality information, from the at least one of the process controller, the field network, and the field device, and a measurement value measured by the field device, the quality information indicating a validity of the measurement value based on the status information of the at least one of the process controller, the field network, and the field device;
a second collection unit that collects the status information from the first and second diagnosis units; and
a correction unit that corrects the quality information-collected by the first collection unit using the status information collected by the second collection unit,
wherein the display apparatus displays the measurement value collected by the first collection unit, and the status information collected by the second collection unit, in parallel on the same time axis, and
wherein the display apparatus comprises:
a first display area that displays time-series information regarding a process specified by a process identifier designated by a user; and
a second display area that displays time-series information regarding the measurement device specified by a device identifier designated by the user.

9. The information management system according to claim 6, wherein the display apparatus has a filter function of selecting information to be displayed based on the user's instruction.

10. An information management method comprising:
a step of generating status information by a first diagnosis unit indicating a status of at least one of a process controller, a field network, and a field device, the process controller being connected to the information management apparatus via a control network, and the field device being connected to the process controller via the field network;
a step of generating status information by a second diagnosis unit indicating a status of the control network;
a step of collecting quality information, from the at least one of the process controller, the field network, and the field device, and a measurement value measured by the field device, the quality information indicating a validity of the measurement value based on the status information of the at least one of the process controller, the field network, and the field device;
a step of collecting the status information from the first and second diagnosis units;

a step of correcting the quality information using the status information collected from the first and second diagnosis units;

a step of collecting device data of at least one of the process controller, the field device, a path device included in the field network, and a path device included in the control network, in addition to the status information; and a step of generating the status information using the device data collected for the at least one of the process controller, the field network, and the field device, each not having status information.

11. The information management method according to claim 10, further comprising:

a step of generating a representative status for the measurement value measured by the field device based on a plurality of pieces of status information collected for the process controller, the field network, and the field device.

12. The information management method according to claim 10, further comprising:

a step of displaying the measurement value, which has been collected, and the status information, which has been collected, in parallel on the same time axis.

13. An information management method, comprising:

a step of generating status information by a first diagnosis unit indicating a status of at least one of a process controller, a field network, and a field device, the process controller being connected to the information management apparatus via a control network, and the field device being connected to the process controller via the field network;

a step of generating status information by a second diagnosis unit indicating a status of the control network;

a step of collecting quality information, from the at least one of the process controller, the field network, and the field device, and a measurement value measured by the field device, the quality information indicating a validity of the measurement value based on the status information of the at least one of the process controller, the field network, and the field device;

a step of collecting the status information from the first and second diagnosis units;

a step of correcting the quality information using the status information collected from the first and second diagnosis units;

a step of displaying the measurement value, which has been collected, and the status information, which has been collected, in parallel on the same time axis;

a step of displaying time-series information regarding a process specified by a process identifier designated by a user; and a step of displaying time-series information regarding the field device specified by a device identifier designated by the user.

14. The information management method according to claim 12, further comprising:

a step of selecting information to be displayed based on the user's instruction.

* * * * *